United States Patent [19]

Radocaj

[11] 4,402,677
[45] Sep. 6, 1983

[54] BELT TENSIONER
[75] Inventor: Mijo Radocaj, Massillon, Ohio
[73] Assignee: Dyneer Corporation, Canton, Ohio
[21] Appl. No.: 227,586
[22] Filed: Jan. 23, 1981
[51] Int. Cl.³ .............................................. G01F 3/14
[52] U.S. Cl. ..................................... 474/138; 74/110
[58] Field of Search ....................... 474/138, 137, 136; 74/110

[56] References Cited
U.S. PATENT DOCUMENTS

| 725,577 | 4/1903 | Miller | 74/110 |
|---|---|---|---|
| 1,655,133 | 1/1928 | Clase | 74/110 |
| 1,815,954 | 7/1931 | Opie | 474/138 |
| 2,936,652 | 5/1960 | Gunzner | 74/527 |
| 3,054,299 | 9/1962 | Procter | 474/138 |
| 3,365,968 | 1/1968 | Merriman | 474/138 |
| 3,365,968 | 1/1968 | Merriman | 474/135 |
| 3,812,733 | 5/1974 | Yoshida | 474/111 |
| 3,894,441 | 6/1975 | Falkenberg | 474/138 |
| 3,945,264 | 3/1976 | Falkenberg | 474/138 |
| 4,013,163 | 3/1977 | Gaal | 198/575 |
| 4,145,934 | 3/1979 | Sragal | 474/135 |

FOREIGN PATENT DOCUMENTS 272174 9/1970 U.S.S.R.

Primary Examiner—Lawrence J. Staab
Assistant Examiner—Michael D. Bednarek
Attorney, Agent, or Firm—Frease & Bishop

[57] ABSTRACT

A device for tensioning the endless drive belt for vehicle accessories. An L-shaped housing is mounted in a fixed position adjacent the drive belt. A stub shaft is slidably mounted on the housing and has an idler pulley rotatably mounted on an extended end of the shaft. A pair of cam plates having mutually engageable camming surfaces are slidably mounted in the housing. One of the plates is operatively engaged with the stub shaft and imparts sliding movement to the shaft for moving the idler pulley into tensioning engagement with the drive belt. A compression spring biases the camming plates into sliding engagement with each other moving the pulley toward tensioning engagement with the drive belt. The included angles of the cam plate camming surfaces equal 90° with the angle of the camming surface of the stub shaft engaged cam plate being greater than the angle of the camming surface of the cam plate which is engaged by the tensioning spring whereby a greater force is required to move the pulley in a nontensioning direction than in the belt tensioning direction, achieving better damping and reduced vibration.

11 Claims, 12 Drawing Figures

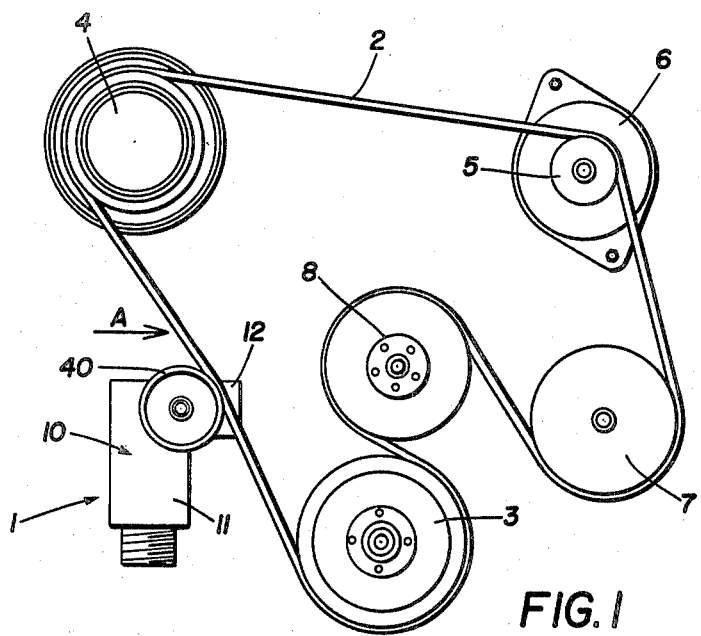
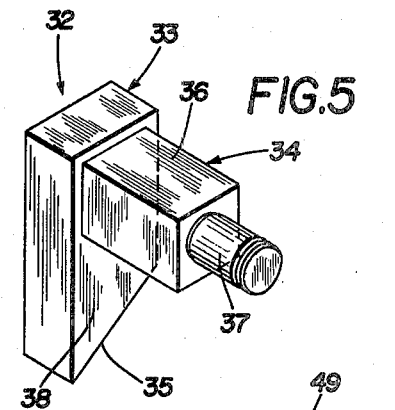
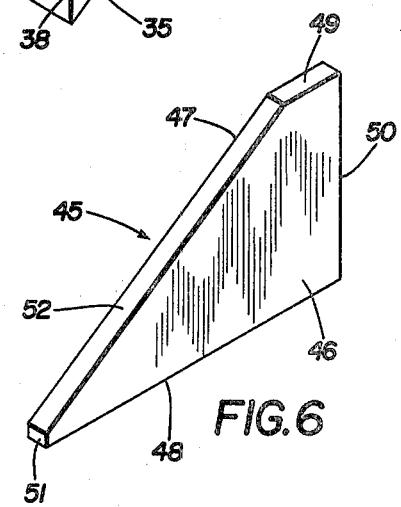
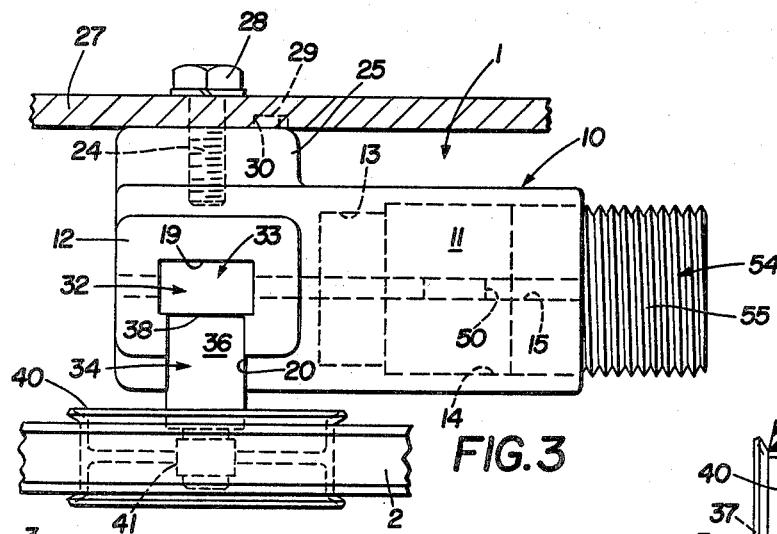
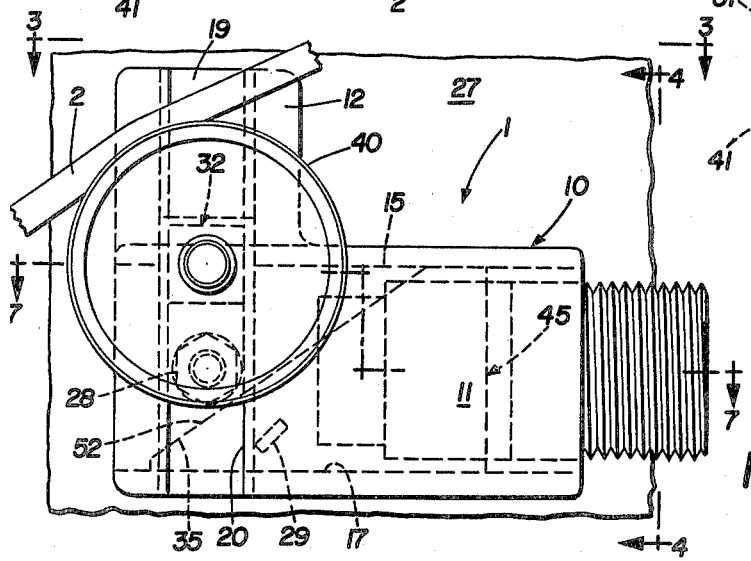
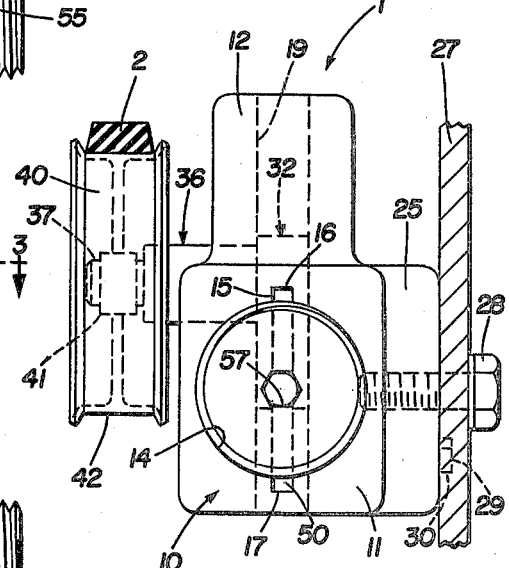

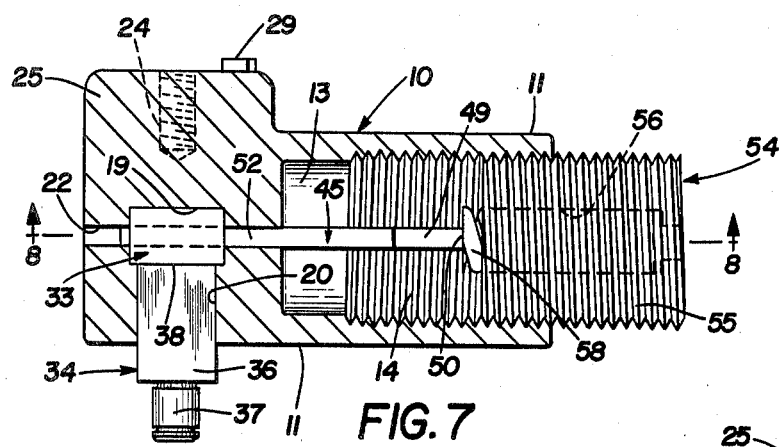
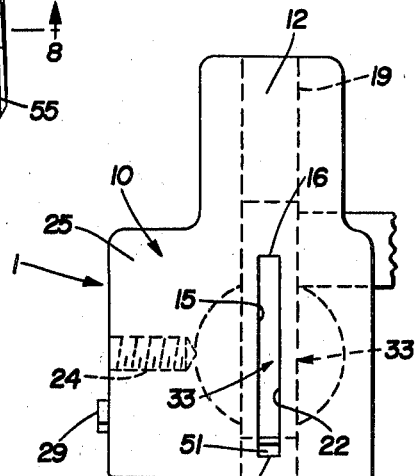
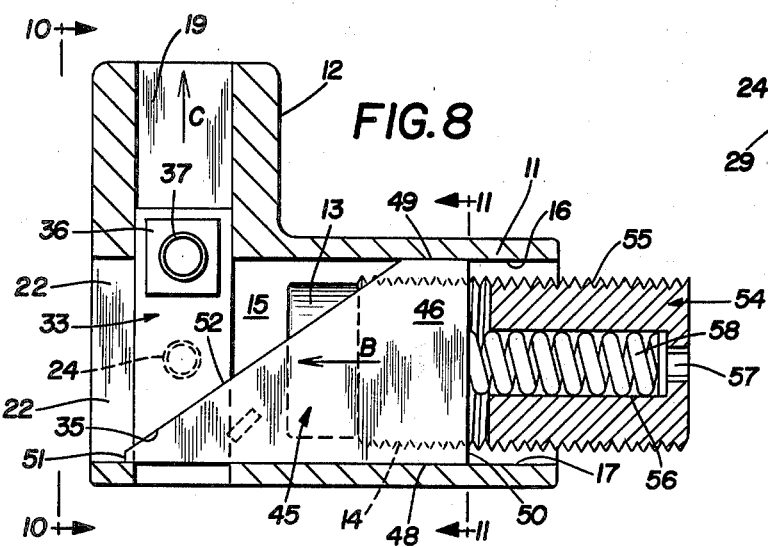
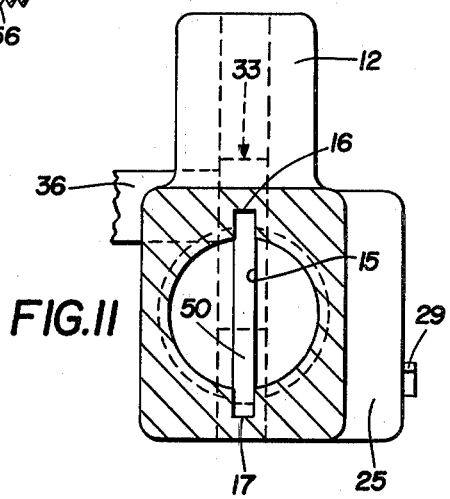
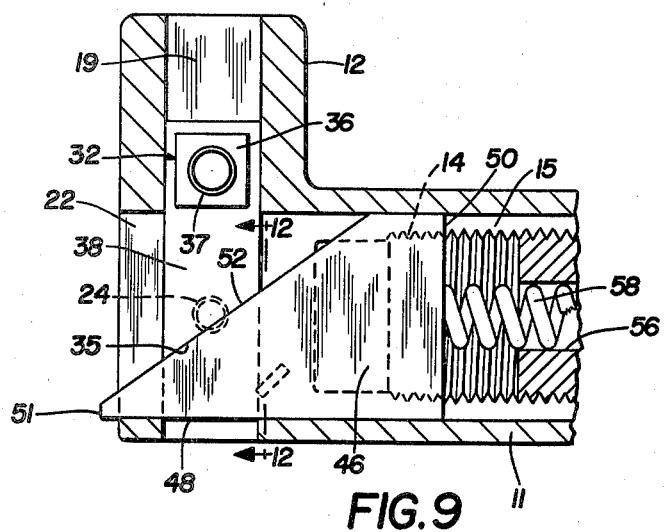
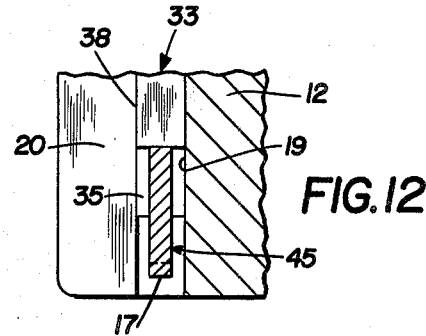

BELT TENSIONER

BACKGROUND OF THE INVENTION

1. Field of the Invention

The invention relates to belt tensioning devices, and in particular to spring-based, cam-actuated belt tensioning devices for use with the endless drive belts of the drive systems for vehicle accessories. More particularly, the invention relates to an extremely simple and inexpensive belt tensioner operable by a compression spring and a pair of camming plates, which maintains a nearly constant predetermined tensioning force on the endless drive belt regardless of whether the engine is on or off, and which provides an improved shock-absorbing damping action on the tensioner.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To ensure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration of the drive belt can cause a whipping action to occur which creates a time lag before fully damping is achieved.

Numerous other types of belt tensioning devices use coil springs which are either in compression or tension, for applying and maintaining the tensioning force on a belt-engaging idler pulley or chain-engaging sprocket. Some examples of these types of constructions are shown in U.S. Pat. Nos. 2,703,019, 2,893,255, 3,413,866, 3,483,763, 3,631,734, 3,768,324, 3,812,733, 3,924,483, 3,965,768 and 4,108,013. Some of these various coil spring-actuated devices use the biasing force of a spring in combination with hydraulic-actuated members for regulating the amount of tensioning force applied to the belt, depending on whether the engine is running or shut off. Examples of these combination spring and hydraulic belt tensioners are shown in U.S. Pat. Nos. 2,051,488, 3,142,193 and 4,077,272.

Various other belt and chain tensioning devices use some type of camming arrangement for transmitting the tensioning force from a spring to the tensioning member. For example, U.S. Pat. No. 1,815,954 shows a chain tensioning device having a pair of slide blocks for moving one of the chain sprocket hubs to tension the chain. U.S. Pat. Nos. 3,365,968, 4,013,163 and 4,145,934 show other types of tensioning devices using camming members for transmitting the tensioning force between the components of the device.

Although it is assumed that many of these prior art tensioning devices perform their intended purposes satisfactorily, there is the need for a belt tensioner which is of a simple, rugged and compact design for use with the endless drive belt of a vehicle accessories drive system, which is able to achieve various belt tensioning loads by adjusting the tension force exerted by the tensioning spring, which provides increased damping to prevent harmful belt whip from occurring and moving the tensioning means in the nontensioning direction, and which reduces vibrations from occurring in the tensioner, which has always been a problem in those tensioners using coil spring.

There is no known belt tensioner construction of which I am aware which imparts a generally constant predetermined tensioning force on an endless drive belt by moving a shaft and idler pulley assembly into tensioning engagement with the drive belt through a pair of mutually engageable camming plates which requires less force to move the tensioning pulley in the tensioning direction than the amount of force required to move the pulley in the nontensioning direction.

SUMMARY OF THE INVENTION

Objectives of the invention include providing an improved belt tensioner construction which is actuated by a single compression coil spring that exerts a biasing force on a pair of mutually engageable cam plates to maintain a nearly constant predetermined tensioning force on the endless drive belt of the vehicle accessory drive system whether the engine is on or off or operating at various speeds or conditions. Another object is to provide a belt tensioner in which a stub shaft is mounted on one of the cam plates and is slidable within a housing that is mounted on the vehicle engine in a fixed position closely adjacent the drive belt, and in which an idler pulley is mounted on the stub shaft and is moved into belt tensioning engagement by the compression spring through the camming action of the cam plates. A further object is to provide such a belt tensioner in which each of the cam plates has an angled camming surface, the total included angles of inclusion totaling 90°, with the camming surface angle of the cam plate which is engaged with the stub shaft being greater than the angle of the camming surface of the cam plate which is engaged by the compression spring whereby a greater force is required to move the idler pulley in a non-tensioning direction than in the belt tensioning direction due to the effective force components transmitted through the engaged camming surface enabling the belt tensioner to achieve increased damping and vibration reduction. Another object is to slidably mount the cam plates within the housing whereby sliding friction occurs between the cam plates and housing walls, which friction will assist in reducing vibrational damping during belt whipping. Still another object is to provide a belt tensioner which is of an extremely rugged and inexpensive design and arrangement, which reduces maintenance and repair problems, which provides a sufficient biasing force by use of a single compression coil spring, which provides an improved damping effect to the tensioner to prevent backlash or a whipping action from occurring, and which provides such a belt tensioner which achieves the stated objectives in a simple, efficient and effective manner, and which solves problems and satisfies needs existing in the art.

These objectives and advantages are obtained by the improved belt tensioner construction for tensioning an endless drive belt of the drive system for vehicle accessories, the general nature of which may be stated as including a housing adapted to be mounted in a fixed position adjacent the drive belt; shaft means slidably mounted within the housing and extending outwardly therefrom and movable in a belt tensioning direction; an idler pulley mounted on the shaft means for tensioning engagement with the drive belt when the shaft means is moved in the belt tensioning direction; first cam means slidably mounted in the housing and operatively engaged with the shaft means for slidably moving said shaft means in the belt tensioning direction; second cam means slidably mounted in the housing and engageable with the first cam means; and spring means biasing the second cam means into camming engagement with the first cam means to slide said first cam means and the shaft means in a belt tensioning direction whereupon the idler pulley engages and tensions the drive belt.

BRIEF DESCRIPTION OF THE DRAWINGS

A preferred embodiment of the invention—illustrative of the best mode in which applicant has contemplated applying the principles—is set forth in the following description and is shown in the accompanying drawings and is particularly and distinctly pointed out and set forth in the appended claims.

FIG. 1 is a diagrammatic view looking toward the front of an engine illustrating an endless drive belt operatively connected to and driving the vehicle accessories with the improved belt tensioner engaged with the belt;

FIG. 2 is an enlarged front elevational view of the improved belt tensioner rotated 90° in the counterclockwise direction from its position shown in FIG. 1;

FIG. 3 is a plan view looking in the direction of arrows 3—3, FIG. 2;

FIG. 4 is an end elevational view looking in the direction of arrows 4—4, FIG. 2;

FIG. 5 is a perspective view of the stub shaft/cam plate subassembly;

FIG. 6 is a perspective view of the spring-engaged cam plate;

FIG. 7 is a sectional view taken on line 7—7, FIG. 2, of the improved belt tensioner removed from its engine mounting plate;

FIG. 8 is a sectional view taken on line 8—8, FIG. 7;

FIG. 9 is a sectional view similar to FIG. 8 with the cam plates and stub shaft shown in an advanced belt tensioning position than the position shown in FIG. 8;

FIG. 10 is a fragmentary end elevational view looking in the direction of arrows 10—10, FIG. 8;

FIG. 11 is a fragmentary sectional view taken on line 11—11, FIG. 8; and

FIG. 12 is a fragmentary sectional view taken on line 12—12, FIG. 9.

Similar numerals refer to similar parts throughout the drawings.

DESCRIPTION OF THE PREFERRED EMBODIMENT

Referring to FIG. 1 of the drawings, the improved belt tensioner is indicated generally at 1, and is shown in tensioning engagement with an endless drive belt 2 of a power transmission belt drive system which is shown diagrammatically looking toward the front of an engine. The accessory drive system consists of a plurality of belt pulleys or sheaves having configurations and diameters determined by and associated with engine accessory components and their locations relative to each other. The various pulleys are supported on their respective engine components which, in turn, are mounted on an engine in a usual manner known in the art. Belt 2 preferably operates in a single vertical plane to eliminate binding and skewing of the belt.

The particular engine accessories drive system shown in FIG. 1 consists of a main driving pulley 3 which is operatively connected to the main drive shaft of the engine, a pulley 4 which is operatively connected to the engine air pump, a pulley 5 which is operatively connected to an alternator 6 which provides electrical power for the engine, a pulley 7 which is operatively connected to the vehicle power steering unit, and a pulley 8 which is operatively connected to the engine water pump.

Improved belt tensioner 1 includes an L-shaped housing, indicated generally at 10, preferably formed of a metal casting. Housing 10 is formed by a pair of integrally joined sections 11 and 12 which form the L-shaped configuration of the housing. Section 11 preferably has a rectangular configuration in cross section (FIG. 11) and is formed with an internal cylindrical bore opening or passage 13, the major portion of which is provided with threads 14. A slot 15 is formed in housing section 11 and extends diametrically through and beyond bore 13 providing a pair of diametrically spaced grooves 16 and 17 which extend along the exterior of bore 13 (FIGS. 8 and 11).

Housing section 12 has walls formed with a smooth walled bore, opening or passage 19, preferably rectangular in cross section (FIGS. 7, 8 and 9). An open slot 20 is formed in a wall or housing section 12 which communicates with passage 19 and extends to the exterior of and throughout the length of housing section 12. A second rectangular slot 22 is formed in a wall of housing section 12 opposite the inner end of housing section 11 and is a continuation of slot 15 formed in housing section 11 (FIG. 8). A threaded opening 24 is formed in a wall portion 25 extending outward of housing section 12 (FIGS. 7 and 10) and opposite the slot 20 for mounting belt tensioner 1 on an engine mounting bracket 27 by a bolt 28, as shown in FIGS. 2, 3 and 4. An alignment stud 29 is formed on housing portion 25 adjacent threaded opening 24 and is received within a complementary-shaped opening 30 formed in engine mounting bracket 27 to align tensioner 1 on bracket 27 and to prevent its rotation on the bracket.

In accordance with one of the features of the invention, a shaft and cam plate subassembly, indicated generally at 32 (FIG. 5), is slidably mounted in housing section 12. Subassembly 32 includes a cam plate and shaft, indicated generally at 33 and 34, respectively. Cam plate 33 preferably is in the form of a parallelepiped and includes six sides, side 35 of which is inclined and provides the camming surface by which the improved results of the invention are obtained. Shaft 34 includes a rectangular shaft portion 36 and an integrally connected cylindrical outer stub shaft end portion 37. Shaft 34 may be formed integrally with cam plate 33 or may be mounted on plate surface 38 by welding, brazing or other attachment means.

A usual idler pulley 40 is rotatably mounted or journaled on stub shaft end 37 outside of the housing by a bearing ring 41 (FIG. 4). Pulley 40 is formed with an outer groove 42 for receivably mounting drive belt 2 therein.

Subassembly 32 is slidably mounted within housing section 12 with cam plate 33 being slidably mounted within smooth wall bore 19 (FIG. 3) and with shaft 34 being slidably mounted within slot 20 and projecting outwardly therefrom. Tensioner 1 is positioned with respect to drive belt 2 whereupon movement of subassembly 32 in an outward direction with respect to housing section 12 will move pulley 40 into tensioning engagement with belt 2, which tensioning direction is indicated by arrow A, FIG. 1.

In accordance with another feature of the invention, a second cam plate, indicated generally at 45 (FIG. 6) is slidably mounted within housing section 11. Cam plate 45 preferably has a relatively flat, generally right triangular configuration with flat sides 46 and 47 terminating in parallel edges 48 and 49, and in end edges 50 and 51. An inclined edge 52 extending between edges 49 and 51 provides a camming surface for carrying out the concept of the invention. Inclined camming surface 52 is the hypotenuse of the triangular-shaped plate and forms an included angle with bottom edge 48 less than 45°. Cam plate 45 is slidably mounted within housing section 11 by bottom edge 48 and top edge 49 being located within grooves 17 and 16, respectively, formed by slot 15, with camming surface 52 extending rearwardly upwardly with respect to housing section 12.

A spring guide, indicated generally at 54, is adjustably mounted in the open end of bore 13 of housing section 11. Spring guide 54 is a cylindrical cup-shaped member having a threaded outer surface 55 and an internal bore 56. Spring guide 54 is mounted within the open end of housing section 11 by the threaded engagement of outer threaded surface 55 with internal threads 14 of bore 13. A hexagonal-shaped hole 57 (FIG. 8) is formed in the end wall of spring guide 54 for receiving a wrench or other tool for mounting and adjusting guide 54 within bore 13. A compression coil spring 58 is seated within spring guide bore 56 and is in butting engagement with end edge 50 of cam plate 45, as shown in FIGS. 8 and 9, for biasing cam plate 45 and subassembly 32 in the belt tensioning direction, as described in greater detail below.

When shaft and cam plate subassembly 32 and cam plate 45 are mounted in assembled position in housing 10, camming surfaces 35 and 52 are mutually engaged with each other, as shown in FIGS. 8 and 9. The included angles of inclination of camming surfaces 35 and 52 total 90° whereby the force exerted by spring 58 in the axial direction of housing section 11 is transmitted to the belt tensioning force on subassembly 32 in the axial direction of housing section 12, which housing sections and axes are perpendicular to each other, that is, with a 90° angle therebetween.

Tensioner 1 is mounted by bolt 28 and alignment pin 29 on bracket 27 in a position closely adjacent drive belt 2. Spring guide 54 is threadably advanced in bore 13 of housing section 11 a predetermined distance so that spring 58 exerts a predetermined axial biasing force on cam plate 45. Cam plate 45 then exerts a predetermined force on cam plate 33, the amount of which depends upon the preset position of spring guide 54, the force rating of spring 58, and the angles of inclination of camming surfaces 35 and 52. Cam plate 45 is biased in the direction of arrow B (FIG. 8) forcing cam plate 33 in the direction of arrow C, which in turn moves shaft 34 and idler pulley 40 in an outward direction with respect to the housing 10 (arrow A, FIG. 1) applying a tensioning force on belt 2. As belt 2 stretches, the biasing force of spring 58 continues to force plate 45 in the direction of arrow B to the position of FIG. 9, wherein the camming surfaces 35 and 52 slide with respect to each other, moving camming plate 33 farther in the outward belt tensioning direction of arrow C.

In accordance with one of the main features of the invention, the angular relationship of camming surfaces 35 and 52 enables spring 58 to withstand larger forces exerted in a counter or nontensioning direction than the tensioning force exerted by spring 58 required to move shaft and cam plate subassembly 32 in the outward or belt tensioning direction. The effective outward belt tensioning force component exerted against cam plate 33 in the axial direction of housing section 12 is greater than the amount of the axial biasing force exerted on plate 45 by spring 58, and correspondingly, the axial force component exerted in the nontensioning direction on cam plate 45 is less than the inward axial force exerted on plate 33 during a belt whipping action. For example, assume that the included angle of camming surface 52 of plate 45 (FIG. 6) is 35° C. and the included angle of camming surface 35 of plate 33 (FIG. 5) is 55° and that the axial in-line tensioning force exerted by spring 58 is 100 pounds. With these parameters, cam plate 45 will exert an outward belt tensioning force of approximately 143 pounds on cam plate 33 which is applied directly on pulley 40 (FIGS. 8 and 9). Correspondingly, an inward nontensioning force exerted on pulley 40 and transmitted to cam plate 33 due to a whipping action of belt 2 will have to be 143 pounds to exert an axial force vector of 100 pounds on cam plate 45 to overcome the 100-pound biasing force of spring 58 in order to move plate 45 in a direction opposite to its belt tensioning direction of arrow B. Thus, the amount of the belt whipping forces which are exerted on pulley 40 must be greater than the biasing force exerted by the tensioning spring to move the pulley in the nontensioning direction. This enables good vibrational damping to be achieved with a spring having a smaller force rating without sacrificing the belt tensioning force provided by the spring.

Decreasing the angle of plate camming surface 52 from 35° to 30° and increasing the angle of camming surface 35 from 55° to 60° would achieve even a greater force transfer between the camming surface. A 100-pound spring force would provide approximately a 173-pound belt tensioning force and, correspondingly, would achieve increased spring damping. However, by changing the plate angles to achieve these increased force transfer results, it will require a greater movement of plate 45 along housing section 11 toward section 12, which in certain applications may be unsatisfactory due to space problems. Thus, the angles of inclination of camming surfaces 35 and 52 may be varied to achieve various force transfer ratios depending upon the particular belt tensioning application. However, the angle of camming surface 35 should be greater than the angle of camming surface 52 to achieve this force transfer advantage to improve the vibrational damping characteristics of belt tensioner 1.

Another feature of the improved belt tensioner which increases the vibrational damping effect achieved by the tensioner is that the dimensions of the various components are such that sliding friction is present between plate edges 48 and 49 and the housing walls which form slots 17 and 16, as well as the sliding friction which occurs between the surfaces of cam plate 33 and the housing walls which define housing smooth wall bore 19. This frictional force does not affect the movement of the cam plates, stub shaft and idler pulley in the belt tensioning direction since this movement is very gradual and extends through a relatively short distance and over an extended period of time. However, this frictional force does appreciably affect any rapid movement of the cam plates, stub shaft and idler pulley in the nontensioning direction since such movement would occur very rapidly due to the sudden belt whipping forces transmitted to the cam plates through the pulley and shaft. Although the improved vibrational damping is achieved primarily by the particular cam plate arrangement discussed above, these frictional forces will assist to increase this damping effect.

Accordingly, the improved belt tensioner construction provides an effective, safe and efficient device which can be formed relatively inexpensively of stamped sheet metal components, which has a unique damping ability provided by a pair of cam plates and in which a single compression coil spring provides the power source for maintaining a nearly constant, predetermined tensioning force on the drive belt; and which provides a device which eliminates difficulties encountered with prior tensioning devices and arrangements and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved belt tensioner is constructed and used, the characteristics of the construction, and the advantageous, new and useful results obtained; the new and useful structures, devices, elements, arrangements, parts, and combinations, are set forth in the appended claims.

I claim:

1. An improved belt tensioner construction for tensioning an endless drive belt of the drive system for vehicle accessories, said construction including:
   (a) a housing adapted to be mounted in a fixed position adjacent the drive belt;
   (b) the housing having walls forming first and second passages which communicate with each other at the intersection of their axes which extend at an angle to one another;
   (c) first slot means formed in a housing wall communicating with said first passage and extending to the exterior of the housing and throughout the length of said first passage;
   (d) first cam means slidably mounted in said first passage;
   (e) second cam means slidably mounted in said second passage and engageable with said first cam means;
   (f) spring means biasing the second cam means into camming engagement with said first cam means to slide said first cam means in a belt tensioning direction along said first passage;
   (g) shaft means mounted on said first cam means and projecting through said first slot means and having an end located outside of said housing; and
   (h) an idler pulley journaled on said shaft end for tensioning engagement with the exterior of the drive belt when the shaft means is moved in belt tensioning direction when said first cam means slidingly moves in belt tensioning direction, whereby the idler pulley engages and tensions the drive belt.

2. The belt tensioner defined in claim 1 in which the housing has an L-shaped configuration formed by first and second sections; and in which said first and second passages are located, respectively, in said first and second sections with the axes of said passages oriented at a 90° angle.

3. The belt tensioner defined in claim 2 in which said second passage has a cylindrical portion which is internally threaded; and in which second slot means is formed in said second section walls extending along and communicating with said cylindrical threaded portion.

4. The belt tensioner defined in claim 3 in which an externally threaded cup-shaped spring guide is adjustably mounted in said cylindrical threaded portion; in which said spring means is a compression coil spring; and in which said coil spring is mounted in said cup-shaped spring guide and operatively engages said second cam means.

5. The belt tensioner defined in claim 3 in which said second slot means extends diametrically through and beyond said cylindrical threaded portion and communicates with said first passage.

6. The belt tensioner defined in claim 3 in which a portion of said second cam means is adapted to extend into said second slot means when moving said first cam means in the belt tensioning direction.

7. The belt tensioner defined in claim 3 in which said first passage is rectangular in cross section.

8. The belt tensioner defined in claim 19 in which said shaft means projects from said first cam means perpendicularly to the axis of said first passage; in which that portion of the shaft means which projects through said first slot means has a rectangular shape in cross section between the first cam means and said idler pulley; and in which the second cam means has a platelike generally triangular shape, one edge of which forms an inclined camming surface.

9. The belt tensioner defined in claim 8 in which said second camming means inclined camming surface forms an included angle with an adjacent edge of less than 45°.

10. The belt tensioner defined in claim 9 in which said first cam means has an inclined camming surface which is engaged by the inclined camming surface of said second cam means; and in which the first cam means inclined camming surface forms an included angle with an adjacent surface greater than the included angle of said second cam means camming surface.

11. The belt tensioner defined in claim 10 in which the total of the included angles of said first and second cam means inclined camming surfaces is 90°.

* * * * *